United States Patent [19]

Reisch

[11] 4,334,642
[45] Jun. 15, 1982

[54] ATHLETIC EQUIPMENT MOUNTING APPARATUS

[75] Inventor: Franz Reisch, Freeport, Ill.

[73] Assignee: Omega Products, Downers Grove, Ill.

[21] Appl. No.: 12,856

[22] Filed: Feb. 16, 1979

[51] Int. Cl.³ .............................................. B62J 7/00
[52] U.S. Cl. ........................................ 224/37; 224/39
[58] Field of Search ............... 224/39 R, 39 A, 32 R, 224/35, 36, 37, 39, 41, 42, 42.46 R, 42.45 R, 273, 274, 276, 278

[56] References Cited

U.S. PATENT DOCUMENTS

| 578,128 | 3/1897 | Wentworth | 224/37 |
| 593,978 | 11/1897 | Boehm | 224/37 |
| 1,058,229 | 4/1913 | Futhey | 224/39 R |
| 1,413,530 | 4/1922 | Harned | 224/39 R UX |
| 1,807,501 | 5/1931 | Alexander | 224/39 R UX |
| 3,631,994 | 1/1972 | Mackzum | 224/252 |
| 3,648,908 | 3/1972 | Thompson | 224/37 |

FOREIGN PATENT DOCUMENTS

| 358617 | 4/1938 | Italy | 224/39 R |
| 361440 | 7/1938 | Italy | 224/39 R |
| 819037 | 8/1959 | United Kingdom | 224/39 R |

Primary Examiner—Stanley H. Tollberg
Attorney, Agent, or Firm—Lindgren & Zickert

[57] ABSTRACT

An apparatus for holding athletic equipment such as tennis rackets or cans of tennis balls which is adapted to be removably mounted to the frame of a bicycle or other wheeled vehicle includes a generally rigid body possessing at least some degree of resiliency for removable connection or mounting thereto various equipment and structural portions adapted for engaging the frame of the wheeled vehicle while holding athletic equipment.

4 Claims, 7 Drawing Figures

ATHLETIC EQUIPMENT MOUNTING APPARATUS

BACKGROUND OF THE INVENTION

A. Field of the Invention

The invention deals with apparatus of the type used for holding athletic equipment and which are mountable upon the frame of a wheeled vehicle such as bicycles. The invention utilizes clamping structures both to hold athletic equipment and also to secure the structure to the frame of the bicycle.

B. Description of the Prior Art

Prior art devices have been proposed for mounting athletic equipment such as bats, balls, tennis rackets, or the like to the frame of a bicycle. Some of these proposals are shown in the following U.S. patents.

U.S. Pat. No. 436,403
U.S. Pat. No. 492,740
U.S. Pat. No. 2,088,980
U.S. Pat. No. 2,482,589
U.S. Pat. No. 2,880,919
U.S. Pat. No. 3,286,891
U.S. Pat. No. 3,648,908
U.S. Pat. No. 3,659,761
U.S. Pat. No. 3,968,912
U.S. Pat. No. 4,009,810
U.S. Pat. No. 4,044,934

BRIEF SUMMARY OF THE INVENTION

The present invention includes a new and improved apparatus for holding athletic equipment which is adapted to be removably mounted upon the frame of a wheeled vehicle such as a bicycle and includes a body and structures for holding the athletic equipment against the body. The body of the invention is generally rigid but possesses some resilient characteristics so as to allow slight deformation without cracking or breaking. The materials of which the invention is constructed are generally weather resistant in that the device is intended for frequent use on the bicycle and must withstand temperature extremes and other weather hazards.

It is an object of the present invention to provide a new and improved athletic equipment carrying apparatus to be used in cooperation with wheeled vehicles such as bicycles.

Another object of the present invention is to provide an apparatus of the above-described type which easily interacts with vehicles of the type described, by performing the carrying operations and yet not scratch or otherwise mar the surface of the frame with which it comes in contact.

Another object of the present invention is to perform the described functions and yet remain easily removable from the frame when no longer needed.

Yet another object of the present invention is to provide an apparatus of the type described above which is lightweight and simply constructed.

Other objects, features and advantages of the invention will be apparent from the following detailed description taken in connection with the accompanying drawings.

DESCRIPTION OF THE PREFERRED EMBODIMENT

Figure 1:
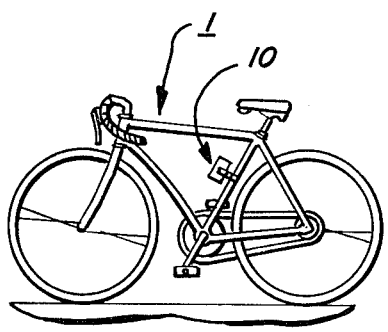
FIG. 1 is an elevational view of a wheeled vehicle utilizing a structure embodying the present invention.
Figure 2:
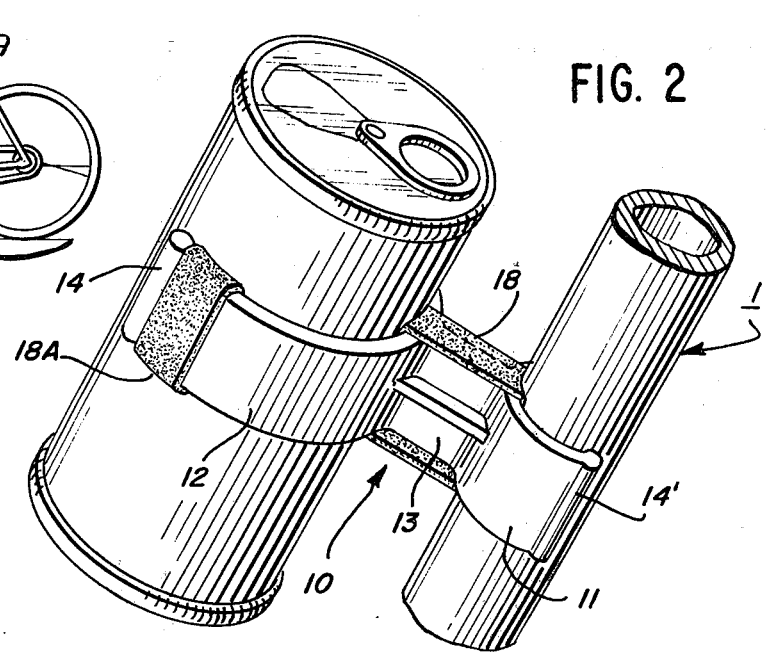
FIG. 2 is a perspective view on an enlarged scale of the device embodying the concepts of the present invention.

Referring to the drawings in greater detail, FIG. 1 shows a bicycle generally designated 1 utilizing an embodiment of the present invention generally designated 10. The apparatus illustrated in FIGS. 1-4 is an embodiment of the present invention particularly suited for engaging a can of tennis balls to the frame of a bicycle 1. The apparatus 10 is preferably made of strong, resilient plastic or other suitable material which can be easily manufactured and comprises a unitary structure including a large bearing 12, a throated or open portion 16, a pair of retaining lips 14, and a non-slip pad 18. A pair of non-slip pads 18A are mounted inside the large bearing 12 in an alternate embodiment. A smaller bearing 11, constructed in a fashion similar to the large bearing 12, but on a smaller scale, is connected to the large bearing 12 by a web 13. Integral to the small bearing 11 is a throated portion 16' and retaining lips 14'. The small bearing 11 is provided for engagement with the frame member of the bicycle so as to mount the same on the like.

As discussed above the embodiment of the invention illustrated in FIGS. 1-4 utilizes a large slightly deformable, throated, generally circumferential, enclosing bearing 12 to releasably hold a can of tennis balls. The throated portion 16 is located on the end of the bearing furthest from the web 13. The bearing 12 has a generally circular wall 21 which encloses an area somewhat greater than 180° and provides a frictional surface for holding items placed there against. The two generally elongated retaining lips 14 are provided at the point where the bearing 12 intersects the throat portion 16. The retaining lips 14 extend slightly to the inside of the inner perimeter of the side wall 21 thereby retaining the can of balls within the bearing 12 once the can of balls has been snapped therein. In the alternate embodiment two generally non-slip pads 18A are placed just to the inside of the lips 14, so as to prevent rattling of the can of balls placed inside the bearing 12. The non-slip nature of the pads 18 or 18A also prevents rotation or slippage of the can from the grip of the large bearing 12.

Figure 3:
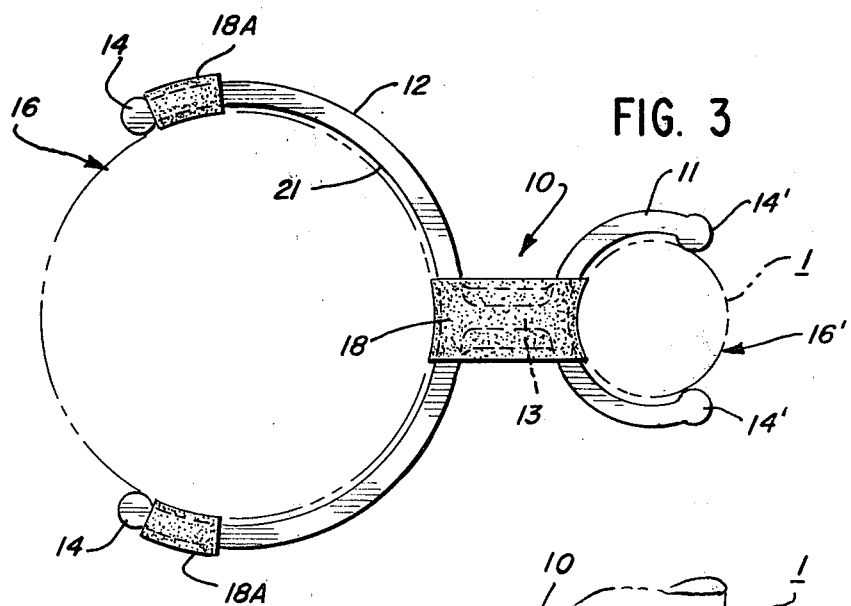
FIG. 3 is a plan view of the device in FIG. 2.
Figure 4:
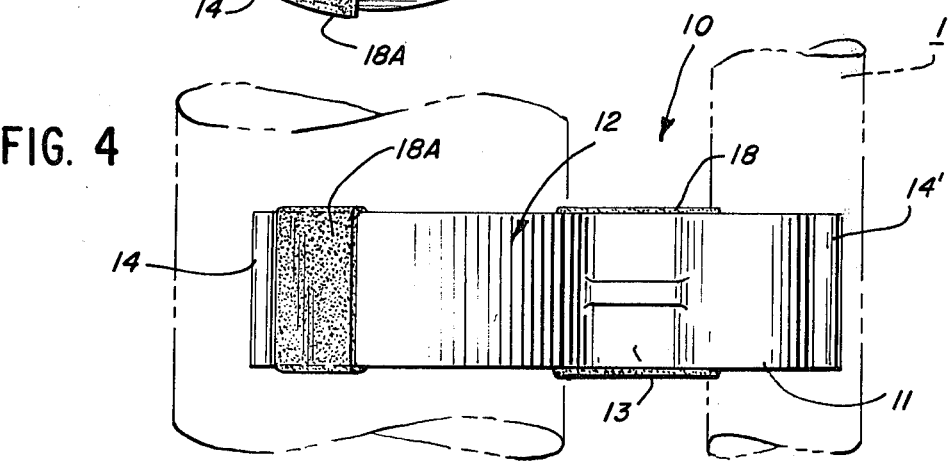
FIG. 4 is an elevational view of the device in FIG. 3.

The smaller bearing 11 is constructed similarly to the large bearing 12, but on a smaller scale. The throated portion 16' of the smaller bearing 11 intersects the bearing at a point thereon, furthest from the web 13. Again, the smaller bearing 11 is generally circular in shape and encloses a portion generally larger than a 180°. It should be noted as shown in FIG. 3, that the portion of the small bearing 11 nearest the throated portion 16' also includes a pair of retaining lips 14'. The smaller bearing 11 is constructed of generally rigid material, but possesses some degree of resiliency so as to allow slight deformation and make mounting on the frame 1 possible. In the preferred embodiment a single non-slip pad 18 (FIGS. 3 and 4) is used to prevent slippage or rattling in either of the bearings 11 or 12, and partially covers the top and bottom of the connecting web 13.

Figure 5:
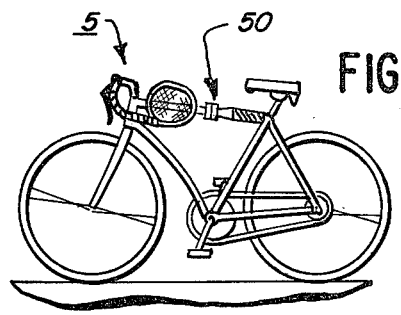
FIG. 5 is an elevational view of a wheeled vehicle utilizing an alternate form of the present invention.
Figure 6:
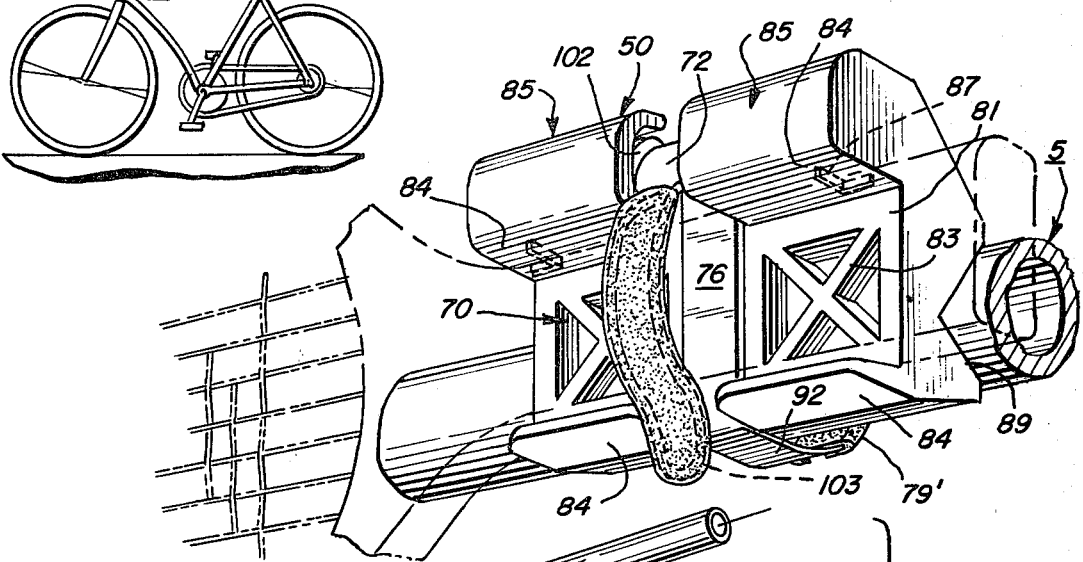
FIG. 6 is a perspective view on an enlarged scale of the alternate embodiment of the present invention.
Figure 7:
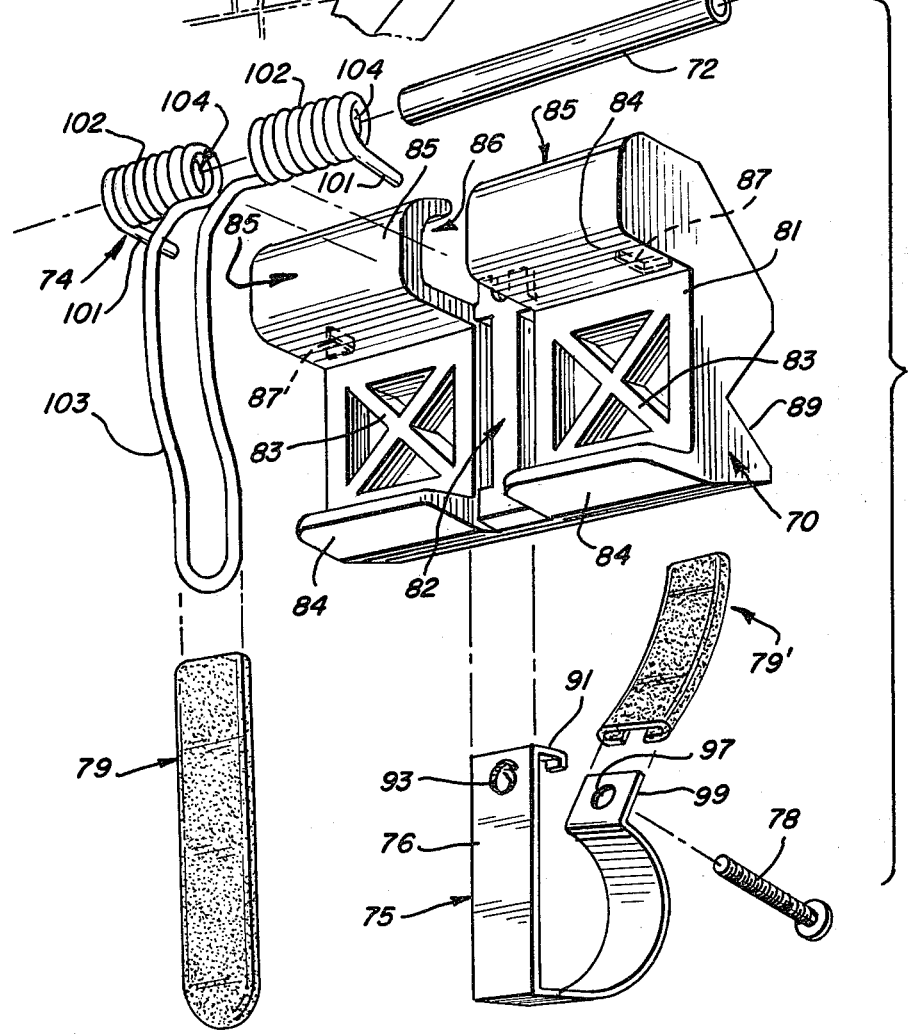
FIG. 7 is an exploded perspective view of the embodiment of FIG. 6.

Referring now more particularly to the alternate embodiment, FIGS. 5, 6 and 7, FIG. 5 shows a bicycle generally designated 5 utilizing an apparatus 50 which incorporates the principles of the present invention. The alternate embodiment, as best illustrated by the exploded view of FIG. 7, includes a generally rigid body 70, a retaining pin 72, a holding element 74, a securing band 75, a screw 78 and non-slip pads 79 and 79'. The apparatus 50 is particularly adapted to attachment to the frame of a wheeled vehicle as illustrated in FIG. 5 and also for holding athletic equipment, particularly including tennis rackets or other racket devices.

The body, generally designated 70, is constructed of a generally rigid, unitary, molded plastic, or other suitable material, and includes a flattened surface 81 which is effectively divided into halves by an engaging trench 82. The trench 82 receives a flattened portion 76 of the securing band 75. The flattened surface 81 includes a pair of X-shaped, strengthening ribs 83. The ribs 83 also engage the handle of the tennis racket thereby preventing slippage. Two pairs of upwardly directed flanges 84 are secured to the outer longitudinal surfaces of the body 70. These retaining flanges 84, further aid the ribs 83 in preventing the athletic equipment from slipping from the flattened surface 81 once placed thereon. Of course, the structure described immediately above could also include a soft resilient pad if desired.

The body 70 includes, to one side, a pair of enveloping structures 85 in which the holding element 74 is mounted. Each enveloping structure 85, includes a downwardly opening void portion 86, which is, in effect, a throated bearing for supporting the holding element 74 as described below. To the underside of the body 70, and to longitudinal extremes of the enveloping structures 85 are located a pair of L-shaped retaining ridges 87, illustrated by hidden lines in FIGS. 6 and 7. These retaining ridges 87 engage a pair of depending nipples 101 discussed below and thereby prevent downward movement of the holding element 74.

The holding element 74 is formed from a continuous length of generally resilient material such as spring steel possessing a degree of rigidity. The holding element 74 includes at opposite ends of its length, a pair of depending nipples 101 which are adjacent a pair of helical coiled lengths 102 which act to bias a lateral holding extension 103. The helical biasing means 102 includes through their center, generally cylindrically shaped voids 104, which interact with a retaining pin 72 so as to retain their form. The biasing portions 102 are loaded into the downwardly opening void 86 from the bottom. The holding extension 103 extends transversely across the generally flat plane 81 and is capable of being pivoted about a point located on the axis of the pin 72. However, the biasing elements 102 strongly bias the holding extension 103 towards the generally flattened surface 81 as the nipples 101 contact the back of the body 70. Consequently, the holding extension 103 may be pulled away from the surface 81 and a handle from a racket inserted onto the surface 81 between the retaining lips 84. The holding extension 103 may then be released so that the racket is held in communication with the body 70. The holding extension 103 is covered by a non-slip pad 79 which prevents the racket from slipping once placed upon the plane 81 and once retained by the holding extension 103.

To the bottom of the body 70 opposite the flat surface 81 is located a V-shaped trough structure 89 which extends essentially the entire length of the body 70 and which is intended for engaging the frame of the bicycle 5.

The securing structure 75 is formed from a singular piece of banding and includes a depending locking part 91 to one extreme which fits around one side of the body 70 and grips the body 70 in such a fashion that it maintains the securing structure 75 in communication with the body 70. The flattened portion 76 is generally of a length equal to the width of the body 70 with which it interacts. To the end of the flattened portion 76 opposite the depending locking part 91 is located a depending curved portion 92 which extends below the surface of the body 70 and which wraps around the portion of the bicycle frame 5 which is untouched by the trough 89. On the end of the curved portion 92 is a base part 99 which includes an aperture 97 intended for receiving the length of the screw 78 which then is inserted into a threaded aperture 93 located in the flattened portion 76 of the securing structure 75. The interactions of the base part 99 with the head of the screw 78 and threaded aperture 93 with threads of the length of the screw 78, draws the ends of the banding of the securing structure 75 together. Therefore, when the securing structure is properly engaged with the body 70 and the body 70 is then engaged with the bicycle frame and utilized as described, the body is securely affixed to the frame 5. A generally non-slip pad 79' which prevents slippage and rotation of the apparatus 50 with relation to the frame 5 is secured to the portion of the securing structure 75 which is in communication with the frame. This resultant stable structure provides a secure base upon which athletic equipment may be carried on a bicycle or similar wheeled vehicle.

The foregoing detailed description has been given for clearness of understanding only and no unnecessary limitation should be understood therefrom as some modification will be obvious to those skilled in the art.

What is claimed is:

1. An apparatus for mounting athletic equipment to the frame of a wheeled vehicle, comprising:

a generally rigid body portion including a flattened surface for engaging and supporting said carried athletic equipment, retaining lip means for preventing said equipment from slipping from said surface and selectively operable biasing means for engaging said equipment for securely holding the same in contact with said body, said selectively operable biasing means comprising a continuous length of generally resilient material including at least one biasing portion and at least one extension extending transversely across said surface, said extension means selectively movable between a clamped position engaging the equipment and a released position facilitating removal of said equipment therefrom, said biasing portion comprising a cylindrically shaped coiled length of said resilient material and said extension comprising a generally transversely oriented concave arcuate section of said length; and means for removably securing said body portion to the frame of a wheeled vehicle comprising a length of banding of generally rigid material possessing a degree of deformability and screw means for urging the ends of said banding toward each other, a flattened portion for engaging said flattened surface and including a bore for receiving said screw means and a depending curved portion for contacting said frame.

2. The apparatus of claim 1 including a V-notch on the side of said body portion opposite said flattened surface for engaging said vehicle frame.

3. The apparatus of claim 1 including a groove for securing said biasing means to said body.

4. The apparatus of claim 1 wherein at least a portion of said extension and said depending curved portion includes a padded portion to prevent slippage, rotation and rattling objects communicating with said retainer length and said depending curved portion.

* * * * *